(12) United States Patent
Baumgartner et al.

(10) Patent No.: US 11,852,069 B2
(45) Date of Patent: Dec. 26, 2023

(54) CYLINDER HEAD FOR A SPARK-IGNITION RECIPROCATING INTERNAL COMBUSTION ENGINE

(71) Applicant: Bayerische Motoren Werke Aktiengesellschaft, Munich (DE)

(72) Inventors: Laura Baumgartner, Schwabhausen (DE); Dirk Christian Leinhos, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/778,158

(22) PCT Filed: Oct. 22, 2020

(86) PCT No.: PCT/EP2020/079696
§ 371 (c)(1),
(2) Date: May 19, 2022

(87) PCT Pub. No.: WO2021/099053
PCT Pub. Date: May 27, 2021

(65) Prior Publication Data
US 2022/0403771 A1    Dec. 22, 2022

(30) Foreign Application Priority Data
Nov. 20, 2019   (DE) ............... 10 2019 131 360.0

(51) Int. Cl.
*F02B 19/12* (2006.01)
*F02B 19/16* (2006.01)
(52) U.S. Cl.
CPC .............. *F02B 19/12* (2013.01); *F02B 19/16* (2013.01)

(58) Field of Classification Search
CPC .................................. F02B 19/12; F02B 19/16
(Continued)

(56) References Cited

U.S. PATENT DOCUMENTS

| 3,974,818 A | 8/1976 | Noguchi et al. |
| 3,982,504 A | 9/1976 | Noguchi et al. |

(Continued)

FOREIGN PATENT DOCUMENTS

| AT | 512532 A4 * | 9/2013 | .......... F02B 19/1095 |
| DE | 2 402 412 A1 | 7/1974 | |

(Continued)

OTHER PUBLICATIONS

International Search Report (PCT/ISA/210) issued in PCT Application No. PCT/EP2020/079696 dated Jan. 20, 2021 with English translation (five (5) pages).

(Continued)

*Primary Examiner* — Mahmoud Gimie
(74) *Attorney, Agent, or Firm* — Crowell & Moring LLP

(57) ABSTRACT

A cylinder head, for an applied-ignition reciprocating-piston internal combustion engine, includes a prechamber ignition system. The prechamber ignition system has a cavity in which an ignition device is arrangeable. The cavity is covered with respect to a combustion space of the reciprocating-piston internal combustion engine with a cover. The cover has at least two apertures which connect the cavity and the combustion space to one another in a gas-conducting fashion. The cavity is divided into a first ignition chamber and a second ignition chamber by a partition, and each ignition chamber is assigned an aperture.

5 Claims, 1 Drawing Sheet

(58) Field of Classification Search
USPC .................................................. 123/260, 261
See application file for complete search history.

(56) References Cited

U.S. PATENT DOCUMENTS

| 4,076,000 | A | 2/1978 | Goto et al. | |
|---|---|---|---|---|
| 2006/0130804 | A1* | 6/2006 | Teraji | F02B 19/12 |
| | | | | 123/256 |
| 2010/0001626 | A1 | 1/2010 | Maul et al. | |
| 2015/0114332 | A1 | 4/2015 | Stifel et al. | |
| 2018/0123324 | A1 | 5/2018 | Niessner et al. | |

FOREIGN PATENT DOCUMENTS

| DE | 24 08 128 A1 | 3/1975 | |
|---|---|---|---|
| DE | 26 04 442 A1 | 3/1977 | |
| DE | 102009055040 A1 * | 6/2011 | ............. F02B 19/12 |
| DE | 10 2014 111 897 A1 | 4/2015 | |
| DE | 10 2016 206 992 A1 | 10/2017 | |
| DE | 10 2016 120 984 A1 | 5/2018 | |
| GB | 1 535 762 A | 12/1978 | |
| JP | 2001082149 A * | 3/2001 | |
| JP | 2016-35854 A | 3/2016 | |
| WO | WO 2008/031482 A1 | 3/2008 | |

OTHER PUBLICATIONS

German-language Written Opinion (PCT/ISA/237) issued in PCT Application No. PCT/EP2020/079696 dated Jan. 20, 2021 (five (5) pages).

German-language Search Report issued in German Application No. 10 2019 131 360.0 dated Jul. 8, 2020 with partial English translation (11 pages).

* cited by examiner

Single-chamber operation

Cross-ignition

Asymmetrical single-chamber operation

"Double ignition"

Divided prechamber with apertures

Asymmetrical divided prechamber

CYLINDER HEAD FOR A SPARK-IGNITION RECIPROCATING INTERNAL COMBUSTION ENGINE

BACKGROUND

The disclosure relates to a cylinder head for an applied-ignition reciprocating-piston internal combustion engine.

With regard to the technical field, reference is made, for example, to the German published patent application DE 10 2014 111 897 A1. Said document discloses an ignition device for igniting fuel-air mixtures in a combustion chamber of an internal combustion engine by means of a corona discharge, having an ignition electrode, an outer conductor which surrounds the ignition electrode and which has a front and a rear end, and an electrical insulator which is arranged between the ignition electrode and the outer conductor and out of which at least one tip of the ignition electrode projects. The at least one tip of the ignition electrode is situated in a space shielded by a cap assigned to the insulator, which cap has an inner side facing toward the insulator and an outer side averted from the insulator and has one or more holes through which the shielded space is connected to a space situated outside the cap, the combustion chamber.

Furthermore, the international patent application with the international publication number WO 2008/031482 A2 has disclosed an ignition plug for igniting a combustible gas mixture in an internal combustion engine, comprising:

an ignition electrode,
an electrical supply line to which the ignition electrode is connected,
an insulator body through which the supply line is led,
a housing head that is seated sealingly on the insulator body, and an external thread for screwing into an internal combustion engine,
a tubular housing which is fastened to the housing head, surrounds the insulator body and bears a hexagonal section,
wherein the tubular housing surrounds an insulator body holder which is welded to the housing head by means of a weld seam and which presses the insulator body against the housing head with a preload.

With regard to the further technical field, reference is also made to the German published patent application DE 10 2016 120 984 A1. Said published patent application discloses a prechamber ignition plug for an internal combustion engine which is operated with gas, and a method for the production thereof.

Furthermore, the German published patent application DE 10 2016 206 992 A1 has disclosed an ignition plug. The ignition plug is in particular a prechamber ignition plug, having a housing, an ignition electrode and a ground electrode, wherein an electrical voltage can be applied to the ignition electrode via a supply line, and wherein the supply line runs at least partially within an insulator, wherein at least one discharge region of the housing is produced from a material with a thermal conductivity of over 150 W/mK.

A disadvantage of the known prechamber ignition systems is the fact that they can be optimally designed either only for high loads and/or rotational speeds or for low loads and/or rotational speeds of the internal combustion engine.

SUMMARY

It is an object of the present disclosure to specify a measure with which a prechamber ignition system avoids the abovementioned disadvantage. As already mentioned, there are no presently existing passive prechamber ignition systems that function perfectly, that is to say provide reliable ignition and generate the lowest possible untreated emissions, over the entire characteristic map of an applied-ignition reciprocating-piston internal combustion engine, that is to say both at part load and at full load, as conventional ignition systems. It is therefore possible to design the prechamber ignition system either for part load or for full load, or a compromise must be reached, which however does not exploit the full potential of the reciprocating-piston internal combustion engine. Whereas a high surface area-to-prechamber volume ratio is advantageous for operation at part load, a low ratio is required for full load. Here, surface area means the area, through which flow passes, of the apertures between chamber and combustion space.

The underlying principle of this disclosure is that of a large prechamber ignition volume being divided into partial ignition chambers in order to be able to optimally cover all operating ranges. A division of the prechamber ignition volume thus yields advantages in part-load operation. The disadvantages of the flow conditions or of the low flow speeds in the presence of low compression pressures can be improved by way of a considerable reduction of the individual volumes. The total momentum of the ignition jets emerging from the partial ignition prechambers can at the same time be kept constant.

The refinement according to patent claim 2 makes it possible for an ignition to be performed with a primary ignition source only in one partial ignition chamber, and for a post-ignition to be realized in the other partial ignition chamber by way of a cross-connection.

With the refinement according to patent claim 3, it is possible for the prechamber ignition system to be optimally adapted both to part load and to full load of the reciprocating-piston internal combustion engine.

With the refinement according to patent claim 4, it is possible for every ignition chamber to be ignited individually, in order to be able to set the best possible ignition time both at full load and at part load of the reciprocating-piston internal combustion engine.

With the refinement according to patent claim 5, it is possible for the number of emerging ignition jets to be adapted to the operating point of the reciprocating-piston internal combustion engine.

The refinement according to patent claim 6 presents a prechamber ignition system which is duly relatively complex but which advantageously has the best ignition characteristics.

Embodiments of the invention will be discussed in more detail below on the basis of six figures for exemplary embodiments, in which:

BRIEF DISCLOSURE OF THE DRAWINGS

DETAILED DESCRIPTION

Figure 1:
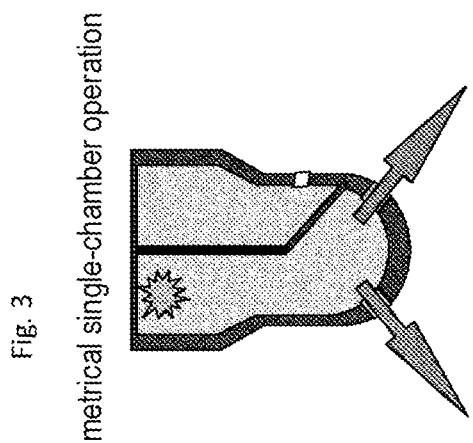
FIG. 1 shows an exemplary embodiment of a prechamber ignition system.

Below, for the sake of clarity, only FIG. 1 is fully numbered, with additional numbering provided in FIG. 2. However, for FIGS. 1 to 6, the same reference numbering applies to identical components even where they are not numbered.

It is pointed out at the outset that the embodiment of the prechamber ignition system 1 can be used both for passive prechamber ignition systems 1, as illustrated in some cases here, and for active prechamber ignition systems 1, with active introduction of fuel, of fuel/air mixture or of air into the cavity of the prechamber ignition system 1. The introduction of fuel into an ignition chamber 6, 7 is not illustrated in FIGS. 1 to 6.

FIG. 1 shows a first exemplary embodiment of a prechamber ignition system 1. The prechamber ignition system 1 is provided for a cylinder head for an applied-ignition reciprocating-piston internal combustion engine (not illustrated). The prechamber ignition system 1 may for example be formed directly in the cylinder head of the reciprocating-piston internal combustion engine, or, as illustrated in FIGS. 1 to 6, the prechamber ignition system 1 may also be configured as a separate component that can be installed into the cylinder head of the reciprocating-piston internal combustion engine.

The prechamber ignition system 1 has a cavity in which at least one ignition device, for example an ignition plug, can be arranged. The ignition device is illustrated schematically by an ignition star. The cavity of the prechamber ignition system 1 is covered with respect to a combustion space 3 of the reciprocating-piston internal combustion engine by means of a cover 2. Here, the cover 2 has at least two apertures 4 that connect the cavity and the combustion space 3 to one another in gas-conducting fashion. During the operation of the reciprocating-piston internal combustion engine, an ignition takes place in the cavity of the prechamber ignition system 1 and ignites a fuel-air mixture in the cavity. An ignition flame or an ignition jet subsequently passes over through the apertures 4 into the combustion space 3 and ignites a fuel-air mixture situated in the combustion space 3.

The cavity is divided by a partition 5 into a first ignition chamber 6 and a second ignition chamber 7, with each ignition chamber 6, 7 being assigned at least one aperture 4.

For all embodiment variants, the number of apertures 4 may also be considerably higher than in the exemplary embodiments illustrated. The size and shape of the apertures 4 may also vary.

FIG. 1 thus illustrates a single-chamber operating mode, which is suitable in particular for low rotational speeds and low load states of the reciprocating-piston internal combustion engine. Here, the second ignition chamber 7 is preferably operated with an active introduction of fuel into the second ignition chamber 7. The main combustion in the combustion space 3 then ignites the fuel-air mixture in the second ignition chamber 7 after a time delay, whereby the untreated emissions of the reciprocating-piston internal combustion engine can be yet further considerably reduced.

Figure 2:
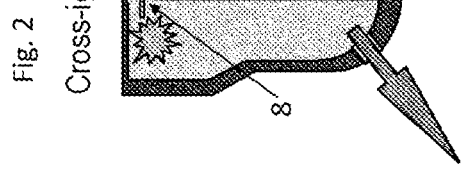
FIG. 2 shows an exemplary embodiment of the prechamber ignition system.

FIG. 2 shows a second exemplary embodiment of the prechamber ignition system 1. In this exemplary embodiment, the partition 5 has an opening 8. This means that, during the operation of the reciprocating-piston internal combustion engine, the ignition spark firstly ignites the first ignition chamber 6, the ignition spark subsequently jumps over to the second ignition chamber 7, and the ignition jets from both ignition chambers 6, 7 subsequently pass over from the cavity into the combustion space 3. In this case, the second ignition chamber 7 is operated passively, that is to say without an introduction of fuel into the second ignition chamber 7. In further exemplary embodiments, it is also possible for a greater number of openings 8 to be provided. The same also applies to FIG. 5.

Figure 3:
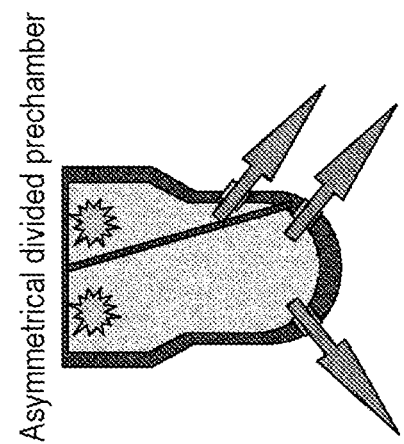
FIG. 3 shows an exemplary embodiment of the prechamber ignition system.

FIG. 3 shows a third exemplary embodiment of the prechamber ignition system 1. In this exemplary embodiment, the first ignition chamber 6 has a greater volume than the second ignition chamber 7. Extensive adaptation to the operating state of the reciprocating-piston internal combustion engine is thus possible both at part load and at full load, or at low rotational speeds or high rotational speeds. The second ignition chamber 7 is again preferably actively operated.

Figure 4:
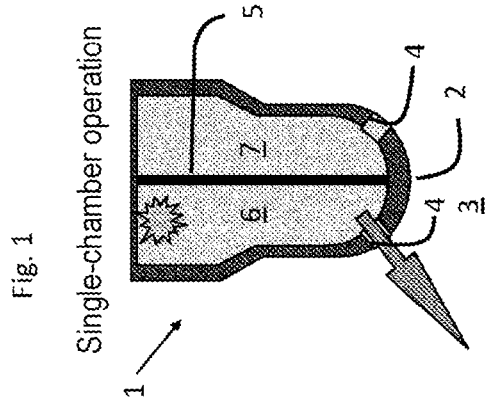
FIG. 4 shows an exemplary embodiment of the prechamber ignition system.

FIG. 4 shows a fourth exemplary embodiment of the prechamber ignition system 1. In this fourth exemplary embodiment, a respective dedicated ignition device is provided both in the first ignition chamber 6 and in the second ignition chamber 7. With this refinement, it is possible for each ignition chamber to be individually adapted to the operating conditions of the reciprocating-piston internal combustion engine. A so-called double ignition is implemented.

Figure 5:
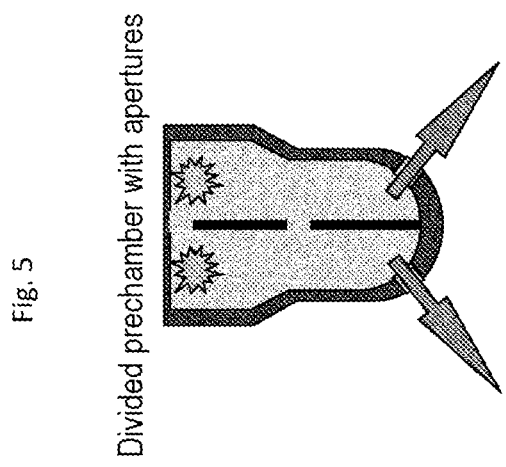
FIG. 5 shows an exemplary embodiment of the prechamber ignition system.

FIG. 5 shows a fifth exemplary embodiment of the ignition device 1. In this fifth exemplary embodiment, too, a respective dedicated ignition device is provided for each of the first ignition chamber 6 and the second ignition chamber 7, wherein, furthermore, the partition has at least one opening 8. A divided ignition prechamber with apertures is thus implemented.

Figure 6:
FIG. 6 shows an exemplary embodiment of the prechamber ignition system.

FIG. 6 shows a sixth exemplary embodiment of a prechamber ignition system 1. With this sixth exemplary embodiment, as in the third exemplary embodiment, a divided prechamber ignition system 1 is provided, with the first volume of the first ignition chamber 6 and the second volume of the second ignition chamber 7 being of different sizes. Furthermore, in this sixth exemplary embodiment, the first ignition chamber 6 is assigned at least two apertures 4, whereas the second ignition chamber 7 is assigned at least one aperture 4 in the cover 2. A divided, asymmetrical prechamber is thus implemented.

Six different exemplary embodiments of divided prechamber ignition systems 1 have thus been presented. The division may be implemented symmetrically (equal partial volumes), asymmetrically (partial volumes of different sizes) and/or with openings 8 in the partition 5. Different variants are also possible with regard to the ignition sources: either ignition is always performed in the first and in the second ignition chamber 6, 7 (by means of two ignition sources, by way of cross-ignition through the opening 8 in the partition 5, or by way of an applicable sparkover (post-ignition in one ignition chamber as a result of the combustion in the combustion space 3), or, at part load, ignition is performed only in one ignition chamber.

LIST OF REFERENCE DESIGNATIONS

1. Prechamber ignition system
2. Cover
3. Combustion space
4. Aperture
5. Partition
6. First ignition chamber 7. Second ignition chamber
8. Opening

The invention claimed is:

1. A cylinder head for an applied-ignition reciprocating-piston internal combustion engine, comprising:
   a prechamber ignition system with a cavity in which an ignition device is arrangeable, wherein
      the cavity is covered with respect to a combustion space of the reciprocating-piston internal combustion engine with a cover,
      wherein the cover has at least two apertures which connect the cavity and the combustion space to one another in a gas-conducting fashion,
      the cavity is divided into a first ignition chamber and a second ignition chamber by a partition,
      each ignition chamber is assigned at least one aperture, and
      the first and the second ignition chamber are assigned a different number of apertures.

2. The prechamber ignition system according to claim 1, wherein the partition has an opening that connects the first ignition chamber and the second ignition chamber to one another in the gas-conducting fashion.

3. The prechamber ignition system according to claim 2, wherein the first ignition chamber has a larger volume than the second ignition chamber.

4. The prechamber ignition system according to claim 3, wherein each ignition chamber is assigned an ignition device.

5. The prechamber ignition system according to claim 1, wherein the first and/or the second ignition chamber are actively scavenged with fuel, with a fuel/air mixture, or with air.

* * * * *